(12) United States Patent
Yeh

(10) Patent No.: US 7,771,092 B2
(45) Date of Patent: Aug. 10, 2010

(54) ADJUSTABLE WARNING LIGHT HOUSING

(76) Inventor: Peter Yeh, No. 10, Lane 808, Chungshan Rd., Hsinhua Chen, Tainan Hsien (TW)

( * ) Notice: Subject to any disclaimer, the term of this patent is extended or adjusted under 35 U.S.C. 154(b) by 230 days.

(21) Appl. No.: 12/221,657

(22) Filed: Aug. 6, 2008

(65) Prior Publication Data

US 2010/0033982 A1 Feb. 11, 2010

(51) Int. Cl.
*F21V 11/04* (2006.01)
(52) U.S. Cl. .................... 362/351; 362/322; 362/542
(58) Field of Classification Search ............... 362/282, 362/321, 322, 351, 354, 359, 360, 482, 488, 362/489, 503, 504, 540, 542
See application file for complete search history.

(56) References Cited

U.S. PATENT DOCUMENTS 2,631,394 A * 3/1953 Sopocko ................. 362/359
5,057,983 A * 10/1991 Ulrich, Sr. ............... 362/322
5,911,498 A * 6/1999 Shemitz et al. ........... 362/322

* cited by examiner

*Primary Examiner*—Y My Quach Lee
(74) *Attorney, Agent, or Firm*—Frenkel & Associates PC

(57) ABSTRACT

An adjustable warning light housing has a base, two adjustable shields respectively and pivotally connected to two opposite inner surfaces of the base, two positioning assemblies respectively mounted between the base and the adjustable shields and an upper shield mounted on the outer surface of the base adjacent to the adjustable shields. A lighting assembly may be mounted inside the base to emit warning signals. The adjustable shields and the upper shield allow the warning light housing to fit different kinds of windshields of vehicles simply and easily. Warning signals being emitted by the lighting assembly cannot reflect into the vehicles so do not disturb a drivers of the vehicles for improved safety.

13 Claims, 4 Drawing Sheets

ADJUSTABLE WARNING LIGHT HOUSING

BACKGROUND OF THE INVENTION

1. Field of the Invention

The present invention relates to a warning light housing, especially an adjustable warning light housing allowing attachment to different kinds of windshields.

2. Description of the Prior Arts

Vehicles, especially emergency vehicles, service vehicles such as tow trucks, ambulances, doctors cars or buses and commercial vehicles such as trucks, oversized trucks or the like are fitted with at least one warning light. The warning light may be blue, red, green, amber or the like and is lighted to alert people to a hazard, such as stopped, slow or fast moving vehicle, wide, oversized or unstable load or the like.

A conventional warning light is attached to a windshield inside a vehicle and has a housing and a lighting assembly. The housing has an inclined opening. The opening corresponds to and is attached close to the windshield of the vehicle. The lighting assembly is mounted in the housing and comprises at least one light to emit a warning signal.

However, inclination of the opening of the housing of the conventional warning light is fixed but windshields of different vehicles have varied inclinations, especially trucks and buses being almost vertical, whereas sports cars or salons being very acute. Therefore, if the inclination of the opening of the housing of the conventional warning light does not match that of the windshield of the vehicle, a gap is formed between the housing and the windshield allowing light to be reflected from the windshield into the car causing driver discomfort or hazards.

To overcome the shortcomings, the present invention provides an adjustable warning light housing to mitigate or obviate the aforementioned problems.

SUMMARY OF THE INVENTION

The main objective of the present invention is to provide an adjustable warning light housing. The adjustable warning light housing has a base, two adjustable shields respectively and pivotally connected to two opposite inner surfaces of the base, two positioning assemblies respectively mounted between the base and the adjustable shields and an upper shield mounted on the outer surface of the base adjacent to the adjustable shields.

A lighting assembly may be mounted inside the base to emit warning signals. The adjustable shields and the upper shield allow the warning light housing to fit different kinds of windshields of vehicles. Warning signals being emitted by the lighting assembly cannot reflect into the vehicle so do not disturb drivers of the vehicles for improved safety.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
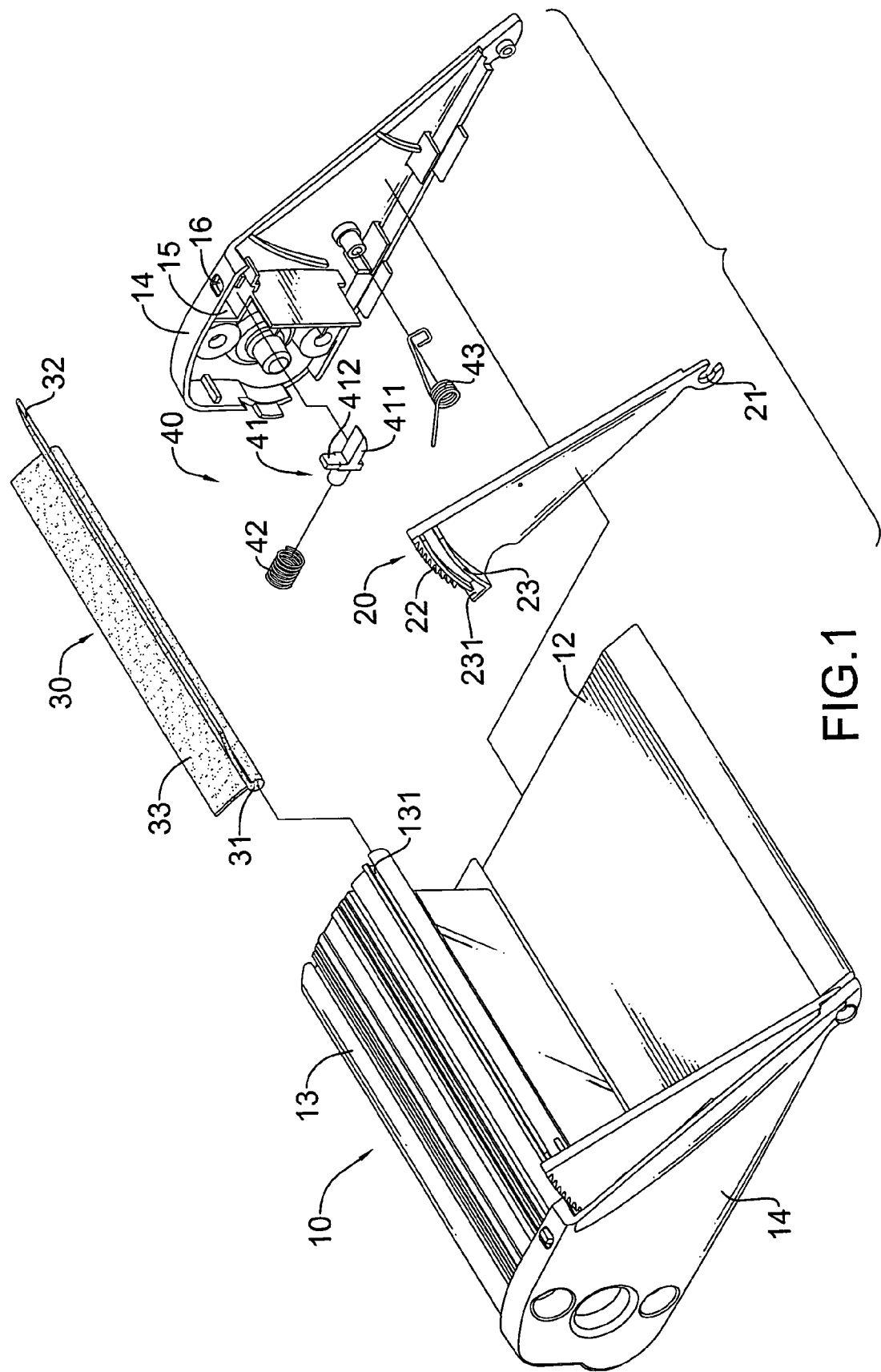
FIG. 1 is an exploded perspective view of an adjustable warning light housing in accordance with the present invention.
Figure 2:
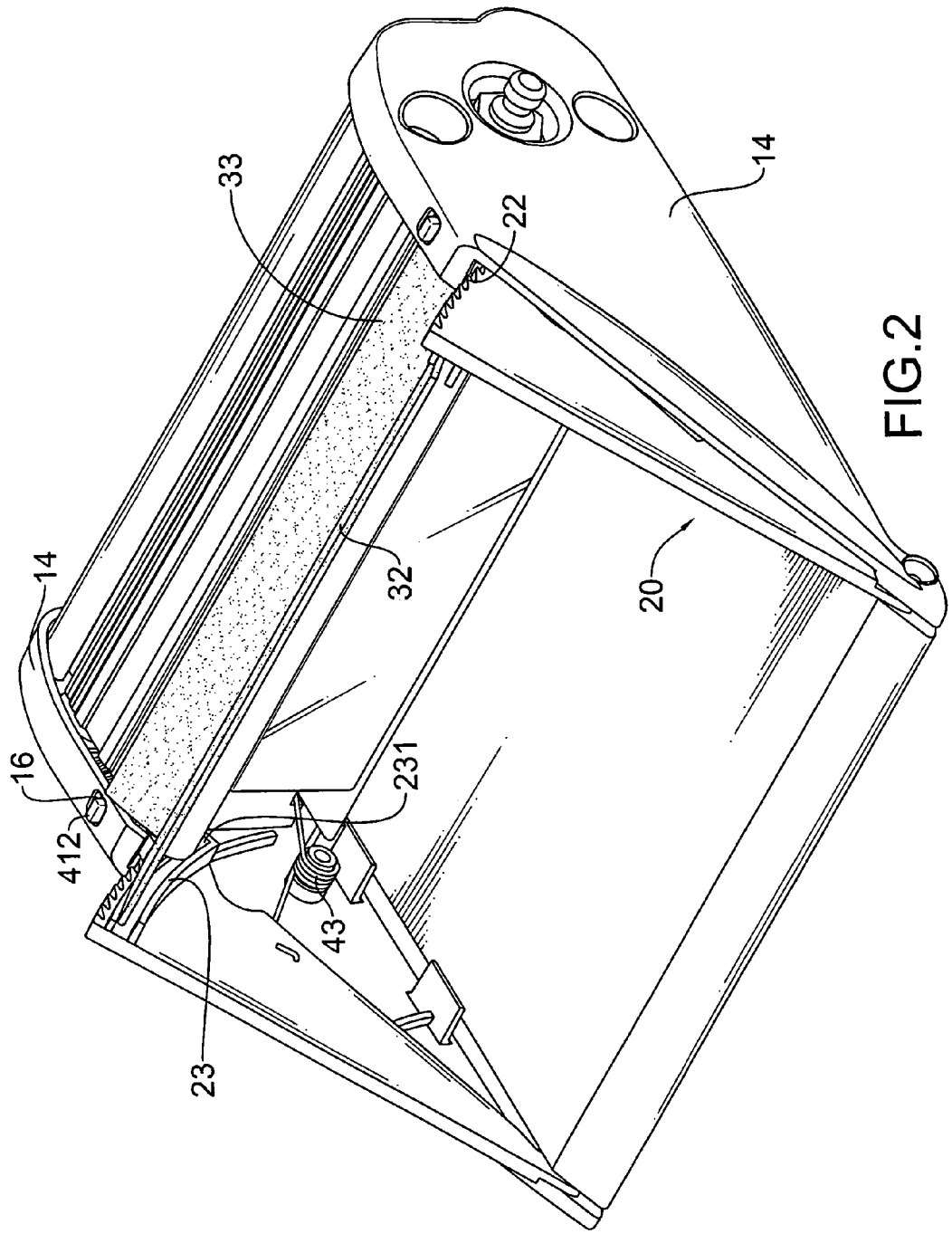
FIG. 2 is a perspective view of the warning light housing in FIG. 1.

With reference to FIGS. 1 and 2, a warning light has an adjustable warning light housing and a lighting assembly. The adjustable warning light housing in accordance with the present invention comprises a base (10), two adjustable shields (20), two positioning assemblies (40) and an upper shield (30).

The base (10) has two opposite inner surfaces and an outer surface and may have a bottom (12), a cover (13) and two side shields (14).

The bottom (12) of the base (10) has a rear edge, a front edge and two opposite side edges.

The cover (13) of the base (10) is L-shaped, is formed on and protrudes from the rear edge of the bottom (12) of the base (10) and has an outer surface, a distal edge and two opposite side edges and may have a shield recess (131). The shield recess (131) is formed in the outer surface of the cover (13) adjacent to the distal edge of the cover (13).

The side shields (14) of the base (10) are respectively mounted on the side edges of the bottom (12) and the cover (13) of the base (10). Each side shield (14) is fan-shaped, has a tip end and an inner surface and may have an upper wall, a switch compartment (15) and a through hole (16). The tip end of the side shield (14) corresponds to the front edge of the bottom (12) of the base (10). The switch compartment (15) is formed in the inner surface of the side shield (14) adjacent to the upper wall of the side shield (14) and has a rear panel and a front opening. The through hole (16) is formed through the upper wall of the side shield (14) and communicates the switch compartment (15).

The adjustable shields (20) are respectively and pivotally connected to the inner surfaces of the base (10), may be respectively and pivotally connected to the inner surfaces of the side shields (14) of the base (10). Each adjustable shield (20) may be fan-shaped and has an inner surface, an optional tip end (21), an adjusting edge (22) and an optional guiding panel (23).

The tip end (21) corresponds to and is pivotally connected to the tip end of the corresponding side shield (14).

The adjusting edge (22) may be an arc, may correspond to the front opening of the switch compartment (15) of the corresponding side shield (14) and may have multiple teeth.

The guiding panel (23) is formed in the inner surface of the adjustable shield (20) adjacent to the adjusting edge (22) of the adjustable shield (20) and has an inner end and a stop (231). The stop (231) is perpendicularly formed on the inner end of the adjusting edge (22) and selectively abuts the distal edge of the cover (13) to prevent over opening of the adjustment shield (20).

The positioning assemblies (40) are respectively mounted between the base (10) and the adjustable shields (20) and on the inner surfaces of the base (10), may be respectively mounted on the inner surfaces of the side shields (14) of the base (10). Each positioning assembly (40) selectively engages the adjusting edge (22) of the corresponding adjustable shield (20) and may have a switch rod (41), a switch resilient device (42) and a shield resilient device (43).

The switch rod (41) is mounted in the switch compartment (15) of the corresponding side shield (14) and has an inner end, an engaging end (411) and a lever (412). The engaging end (411) of the switch rod (41) protrudes out of the front opening of the switch compartment (15) and selectively engages the adjusting edge (22) of the corresponding adjustable shield (20). The lever (412) is formed on the switch rod (41) and protrudes out of the through hole (16) of the corresponding side shield (14) to allow the switch rod (41) to be moved.

The switch resilient device (42) is mounted around the inner end of the switch rod (41), and abuts the rear panel of the switch compartment (15) of the corresponding side shield (14) to return and hold the switch rod (41) forwards, and may be a spring.

The shield resilient device (43) is mounted on the inner surface of the corresponding side shield (14), may be a spring and has two ends. The ends of the shield resilient device (43) respectively abut the corresponding adjustable shield (20) and the corresponding side shield (14) to push the corresponding adjustable shield (20) outside the base (10).

The upper shield (30) is mounted on the outer surface of the base (10) adjacent to the adjustable shields (20), may be mounted on the outer surface of the cover (13) of the base (10) adjacent to the distal edge of the cover (13) of the base (10), may be mounted in the shield recess (131) of the cover (13) of the base (10) and may have a shaft (31), a first wing (32) and a second wing (33). The shaft (31) may be hard and is mounted in the shield recess (131) of the cover (13) of the base (10). The first wing (32) may be soft and deformable and is axially formed on the shaft (31). The second wing (33) may be soft and deformable, is axially formed on the shaft (31) and is shorter than the first wing (32).

The lighting assembly is mounted inside the base (10) to emit warning signals.

Figure 3:
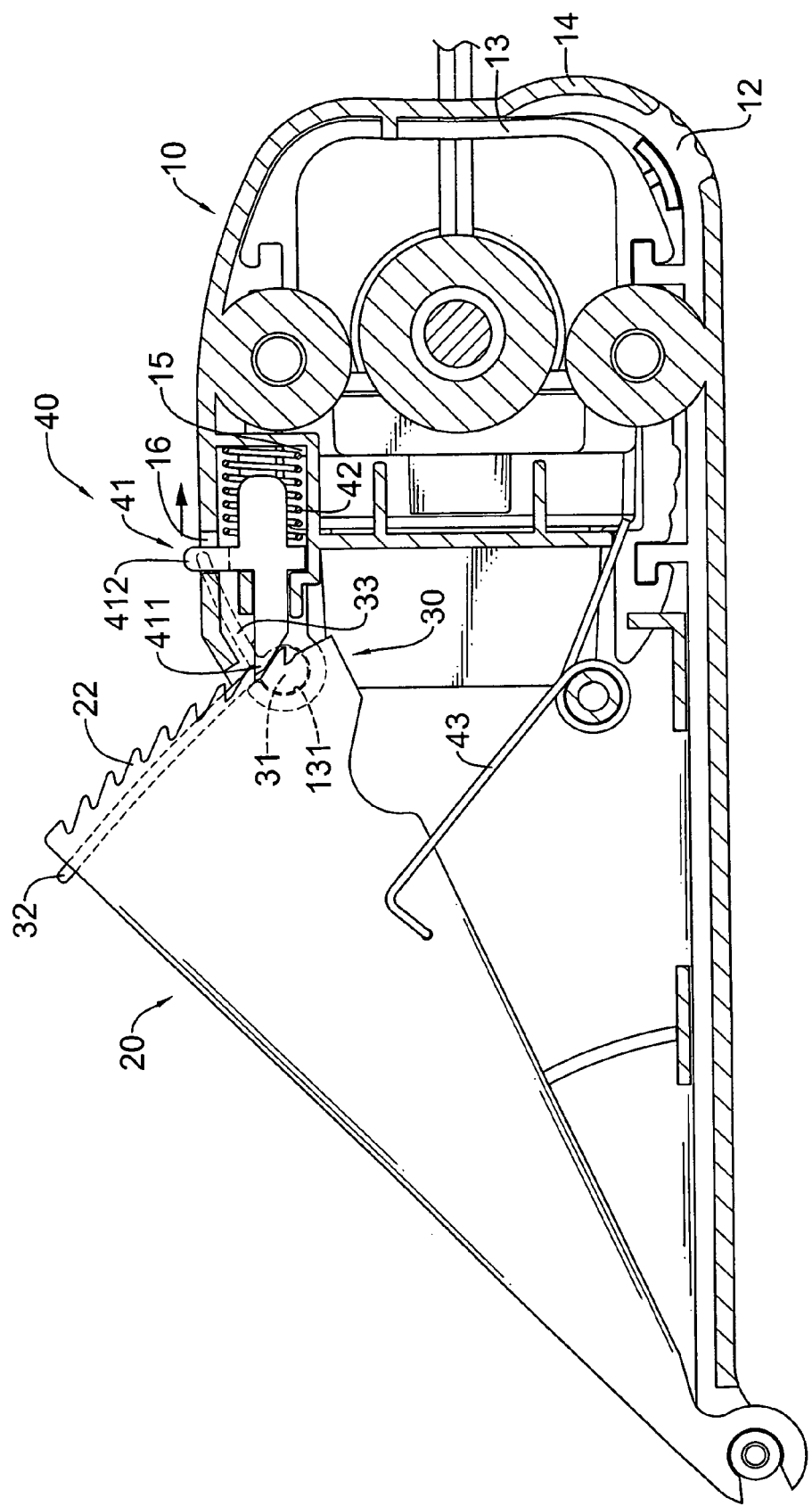
FIG. 3 is a side view in partial section of the warning light housing in FIG. 1, showing adjustable shields outside of a base.
Figure 4:
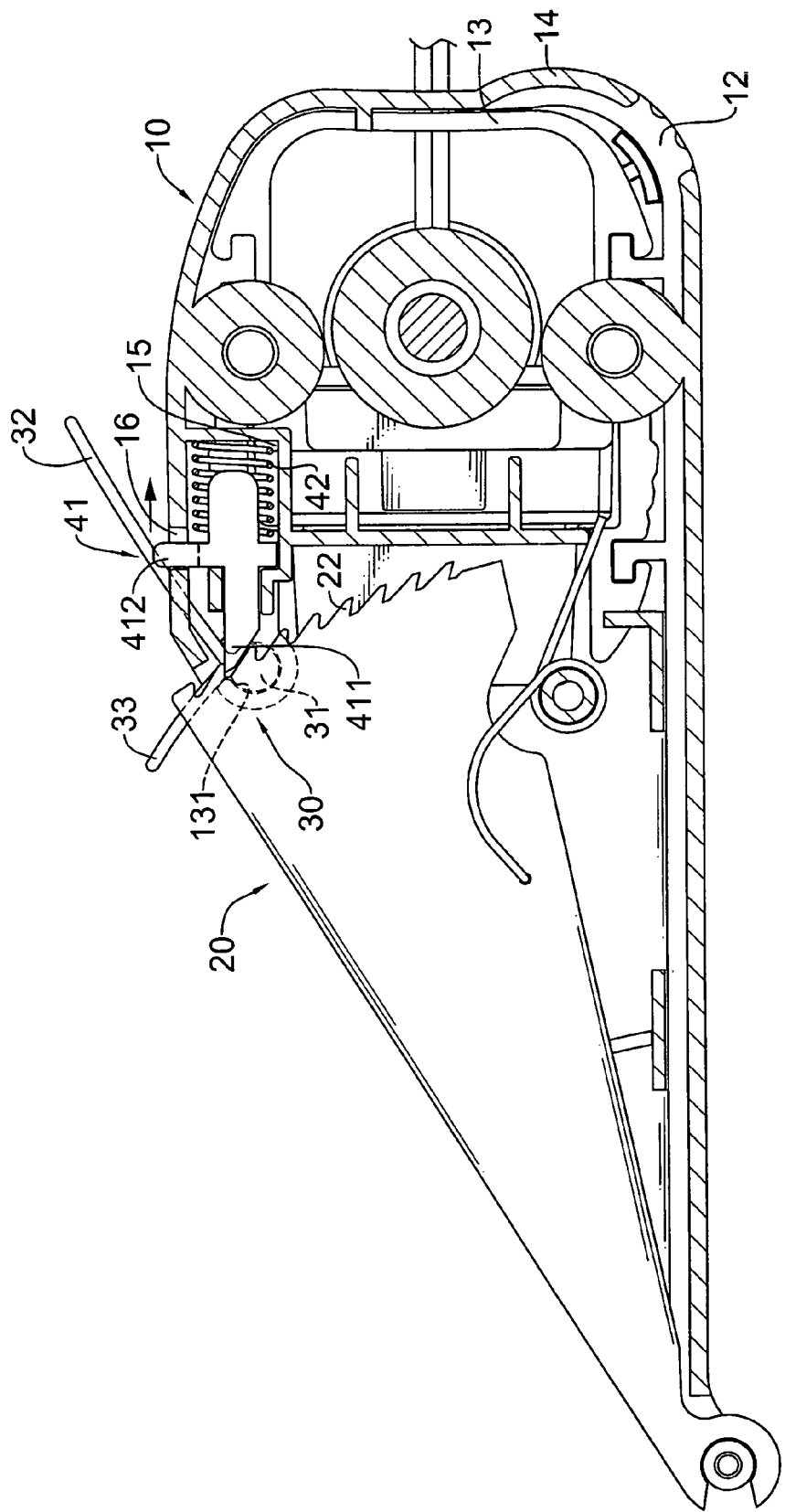
FIG. 4 is another side view in partial section of the warning light housing in FIG. 1, showing the adjustable shields stored inside the base.

With further reference to FIGS. 3 and 4, the first and the second wings (32, 33) of the upper shield (30) are alternatively mounted between the adjustable shields (20). The levers (412) of the switch rods (41) of the positioning assemblies (40) are pushed toward the rear panels of the switch compartments (15) of the side shields (14) to compress the switch resilient devices (42) and to allow the engaging ends (411) of the switch rods (41) to disengage from the adjusting edges (22) of the adjustable shields (20). Therefore, the adjustable shields (20) can pivot relative to the base (10) to abut a windshield or the like. Then, the switch rods (41) are released so the switch resilient devices (42) return the switch rods (41) to engage the adjusting edges (22) of the adjustable shields (20) and fix the adjustable shields (20) in a specific position.

The adjustable warning light housing as described has the following advantages. The adjustable shields (20) and the upper shield (30) are adjustable. Thus, an opening being formed between the front edge of the bottom (12) of the base (10), the adjustable shields (20) and the upper shield (30) can be adjusted to fit different kinds of windshields of vehicles. Warning signals being emitted by the lighting assembly illuminate ahead and do not disturb a driver of the vehicle for improved safety and driver comfort.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An adjustable warning light housing comprising
   a base having
      two opposite inner surfaces; and
      an outer surface;
   two adjustable shields being respectively and pivotally connected to the inner surfaces of the base and each adjustable shield having an adjusting edge;
   two positioning assemblies being respectively mounted between the base and the adjustable shields and on the inner surfaces of the base and each positioning assembly selectively engaging the adjusting edge of the corresponding adjustable shield; and
   an upper shield being mounted on the outer surface of the base adjacent to the adjustable shields.

2. The adjustable warning light housing as claimed in claim 1, wherein
   the base further has
      a bottom having
         a rear edge;
         a front edge; and
         two opposite side edges;
      a cover being L-shaped, being formed on and protruding from the rear edge of the bottom of the base and having
         the outer surface;
         a distal edge; and
         two opposite side edges; and
      two side shields being respectively mounted on the side edges of the bottom and the cover of the base and each side shield being fan-shaped and having
         a tip end corresponding to the front edge of the bottom of the base; and
         an inner surface;
   the adjustable shields are respectively and pivotally connected to the inner surfaces of the side shields of the base;
   the positioning assemblies are respectively mounted on the inner surfaces of the side shields of the base; and
   the upper shield is mounted on the outer surface of the cover of the base adjacent to the distal edge of the cover of the base.

3. The adjustable warning light housing as claimed in claim 2, wherein
   the cover of the base further has a shield recess being formed in the outer surface of the cover adjacent to the distal edge of the cover; and
   the upper shield is mounted in the shield recess of the cover of the base and having
      a shaft being mounted in the shield recess of the cover of the base;
      a first wing being axially formed on the shaft; and
      a second wing being axially formed on the shaft and being shorter than the first wing.

4. The adjustable warning light housing as claimed in claim 2, wherein each adjustable shield further has
   an inner surface; and
   a guiding panel being formed in the inner surface of the adjustable shield adjacent to the adjusting edge of the adjustable shield and having
      an inner end; and
      a stop being perpendicularly formed on the inner end of the adjusting edge and selectively abutting the distal edge of the cover.

5. The adjustable warning light housing as claimed in claim 2, wherein
   each side shield of the base further has
      an upper wall;

a switch compartment being formed in the inner surface of the side shield adjacent to the upper wall of the side shield and having
a rear panel; and
a front opening; and
a through hole being formed through the upper wall of the side shield and communicating the switch compartment;
each positioning assembly further has
a switch rod being mounted in the switch compartment of the corresponding side shield and having
an inner end;
an engaging end protruding out of the front opening of the switch compartment and selectively engaging the adjusting edge of the corresponding adjustable shield; and
a lever being formed on the switch rod and protruding out of the through hole of the corresponding side shield; and
a switch resilient device being mounted around the inner end of the switch rod and abutting the rear panel of the switch compartment of the corresponding side shield.

6. The adjustable warning light housing as claimed in claim 5, wherein
the cover of the base further has a shield recess being formed in the outer surface of the cover adjacent to the distal edge of the cover; and
the upper shield is mounted in the shield recess of the cover of the base and having
a shaft being mounted in the shield recess of the cover of the base;
a first wing being axially formed on the shaft; and
a second wing being axially formed on the shaft and being shorter than the first wing.

7. The adjustable warning light housing as claimed in claim 5, wherein each adjustable shield further has
an inner surface; and
a guiding panel being formed in the inner surface of the adjustable shield adjacent to the adjusting edge of the adjustable shield and having
an inner end; and
a stop being perpendicularly formed on the inner end of the adjusting edge and selectively abutting the distal edge of the cover.

8. The adjustable warning light housing as claimed in claim 5, wherein
each adjustable shield is fan-shaped and has a tip end corresponding to and being pivotally connected to the tip end of the corresponding side shield; and
the adjusting edge of each adjustable shield is an arc corresponding to the front opening of the switch compartment of the corresponding side shield and having multiple teeth.

9. The adjustable warning light housing as claimed in claim 8, wherein
the cover of the base further has a shield recess being formed in the outer surface of the cover adjacent to the distal edge of the cover; and
the upper shield is mounted in the shield recess of the cover of the base and having
a shaft being mounted in the shield recess of the cover of the base;
a first wing being axially formed on the shaft; and
a second wing being axially formed on the shaft and being shorter than the first wing.

10. The adjustable warning light housing as claimed in claim 8, wherein each adjustable shield further has
an inner surface; and
a guiding panel being formed in the inner surface of the adjustable shield adjacent to the adjusting edge of the adjustable shield and having
an inner end; and
a stop being perpendicularly formed on the inner end of the adjusting edge and selectively abutting the distal edge of the cover.

11. The adjustable warning light housing as claimed in claim 8, wherein each positioning assembly further has a shield resilient device being mounted on the inner surface of the corresponding side shield and having two ends being respectively abutting the corresponding adjustable shield and the corresponding side shield.

12. The adjustable warning light housing as claimed in claim 11, wherein
the cover of the base further has a shield recess being formed in the outer surface of the cover adjacent to the distal edge of the cover; and
the upper shield is mounted in the shield recess of the cover of the base and having
a shaft being mounted in the shield recess of the cover of the base;
a first wing being axially formed on the shaft; and
a second wing being axially formed on the shaft and being shorter than the first wing.

13. The adjustable warning light housing as claimed in claim 11, wherein each adjustable shield further has
an inner surface; and
a guiding panel being formed in the inner surface of the adjustable shield adjacent to the adjusting edge of the adjustable shield and having
an inner end; and
a stop being perpendicularly formed on the inner end of the adjusting edge and selectively abutting the distal edge of the cover.

\* \* \* \* \*